(No Model.)

W. P. KOOKOGEY.
SEPARATOR FOR SECONDARY BATTERIES.

No. 433,174. Patented July 29, 1890.

Witnesses:
D. W. Gardner
Arthur E. Walradt
Charles M. Demon

Inventor:
William P. Kookogey
by Salter S. Clark
Attorney

UNITED STATES PATENT OFFICE.

WILLIAM P. KOOKOGEY, OF BROOKLYN, N. Y., ASSIGNOR TO THE KOOKOGEY ELECTRIC COMPANY.

SEPARATOR FOR SECONDARY BATTERIES.

SPECIFICATION forming part of Letters Patent No. 433,174, dated July 29, 1890.

Application filed March 10, 1890. Serial No. 343,366. (No model.)

*To all whom it may concern:*

Be it known that I, WILLIAM P. KOOKOGEY, of the city of Brooklyn, county of Kings, and State of New York, have invented a new and useful Separator for Secondary Batteries, of which the following is a specification.

My invention relates to devices for preventing the several plates which are contained within a single secondary-battery cell from touching each other; and it consists, in general, of a separator made of insulating, non-oxidizable, and comparatively rigid material, made to fit the plate and passing entirely around it.

Figure 1:
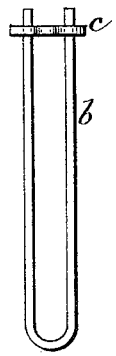
Figure 2:
Figure 3:
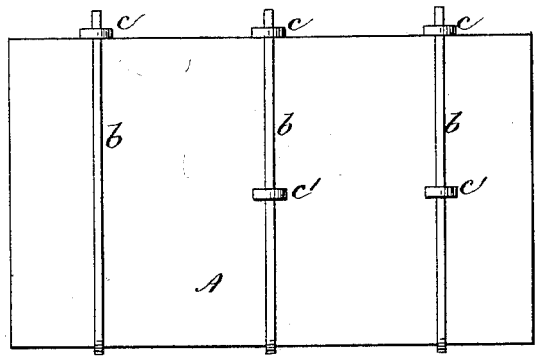

In the drawings, Figure 1 is a side view of a single separator and its binder; Fig. 2, a top view of the binder; Fig. 3, a front view of the plate with three separators upon it in position, and Fig. 4 a side view of an alternative form of the separator.

The separator $b$ and binder $c$ may be made of hard rubber or other equivalent material having the properties of not serving as a conductor between the plates, not affected injuriously by the acid, and of comparative rigidity—that is, as compared with the ordinary soft-rubber separators. The separator $b$ is U-shaped and incloses the plate A on the bottom and two sides of the plate, its upper ends being fastened by being passed through the holes $e$ of the binder $c$. It thus incloses the plates snugly, but without compression. If desirable to produce a closer contact, another binder $c'$, passing through the plate A at its center, may be used. The advantages of this form of separator are, that it is simple and easily manufactured; that it does not press the plate from top to bottom, like the ordinary soft-rubber band, and, on the other hand, that, passing entirely around the plate, it always retains its position upon the plate, and, projecting beyond the plate at both top and bottom, it serves as a rest of insulating material, by which the plate is raised above the bottom of the jar.

Figure 4:
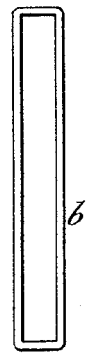

Fig. 4 is an alternative form of the separator, consisting of a single piece of hard rubber or equivalent material cut so that its opening is just the size of the plate, and therefore fitting to it without any binder.

Instead of making the separator $b$ of a single U-shaped piece, it might be made, simply, of two strips—one on each side of the plate—and having a binder at top and bottom.

I claim as my invention—

1. A separator for secondary batteries, made of hard rubber or other insulating, non-oxidizable, and non-contractile material in one or more parts and passing entirely around the plate, substantially as and for the purpose described.

2. A separator for secondary batteries, consisting of two pieces of hard rubber or other insulating, non-oxidizable, and non-contractile material, one a bent strip to inclose the bottom and two sides and the other a binder uniting the ends of the other strip over the top of the plate, substantially as and for the purpose described.

In witness whereof I hereunto set my hand, at the city of New York, the 7th day of March, 1890.

WM. P. KOOKOGEY.

Witnesses:
ARTHUR E. WALRADT,
SALTER S. CLARK,
CHARLES M. DEMOND.